United States Patent [19]
Nordling

[11] Patent Number: 5,363,587
[45] Date of Patent: Nov. 15, 1994

[54] REMOTE CONTROL FISHING BOAT REMOTE TROLLER

[76] Inventor: Carl E. Nordling, 7201 Forest Wood Dr., Austin, Tex. 78745

[21] Appl. No.: 98,071

[22] Filed: Jul. 28, 1993

[51] Int. Cl.⁵ ............................................. A01K 89/00
[52] U.S. Cl. ........................................ 43/26.1; 43/4
[58] Field of Search ............................ 43/4, 26.1, 25; 446/160, 165

[56] References Cited

U.S. PATENT DOCUMENTS

| | | |
|---|---|---|
| 2,968,112 | 1/1961 | McClure . |
| 3,049,829 | 8/1962 | Clapp . |
| 3,126,166 | 3/1964 | Weinberg . |
| 3,618,254 | 11/1971 | Myers . |
| 3,710,500 | 1/1973 | Pena . |
| 3,739,516 | 6/1973 | Holling ................................. 43/26.1 |
| 3,758,975 | 9/1973 | Curtis . |
| 3,793,761 | 2/1974 | Bonham . |
| 3,802,110 | 4/1974 | Guillemain . |
| 3,911,609 | 10/1975 | Baya . |
| 4,161,077 | 7/1979 | Ciaccio et al. . |
| 4,283,025 | 8/1981 | Whisenhunt . |
| 4,339,888 | 7/1982 | Sheng-Jung . |
| 4,344,587 | 8/1982 | Hildreth . |
| 4,378,652 | 4/1983 | Lindgren . |
| 4,449,317 | 5/1984 | Brodribb et al. . |
| 4,517,760 | 5/1985 | Randle . |
| 4,635,391 | 1/1987 | Early . |
| 4,757,633 | 7/1988 | Van Cleve . |
| 4,856,222 | 8/1989 | Hannam . |
| 5,077,929 | 1/1992 | Khan ................................... 43/26.1 |
| 5,086,581 | 2/1992 | Barra et al. . |
| 5,154,016 | 10/1992 | Fedora ................................. 43/26.1 |
| 5,182,874 | 2/1993 | Powell ................................... 43/25 |

Primary Examiner—P. Austin Bradley
Assistant Examiner—James Miner
Attorney, Agent, or Firm—Oliff & Berridge

[57] ABSTRACT

A remote controlled fishing device permitting an angler to fish in places remote from the angler's location or those in which it is difficult to place a fishing line by casting or trolling. The fishing device comprises a miniature sized boat having a fishing rod mounted in the stern. The boat is capable of operating at one of two speeds, or alternatively, at a continuum of speeds. A control system permits control of the direction of movement and the speed of the boat. Also mounted in the stern of the boat is a line cutter positioned so that the fishing line passes through the line cutter. Should the fishing line become snagged, the line cutter may be activated using the control system to sever the line and free the boat. The fishing boat is controlled by a four channel radio controller, held by angler, and a receiver mounted on the boat. The channels control speed of the boat, the direction movement of the boat, the line cutter, and winding of the fishing line onto the reel.

20 Claims, 9 Drawing Sheets

REMOTE CONTROL FISHING BOAT REMOTE TROLLER

BACKGROUND OF THE INVENTION

1. Field of the Invention

The present invention relates generally to radio controlled fishing vessels that permit anglers to fish in otherwise inaccessible areas and to permit trolling, drifting, or bottom fishing in the angler's favorite lake, pond or back bays in and along the coast.

2. Description of Related Art

Anglers have long expressed a need to be able to place the fishing line were the fish are. Many times the fish are located in areas difficult for the angler to reach. The fish may be beyond casting range for a shore based angler or in areas surrounded by vegetation/obstructions both above and below the surface of the water. It may be difficult or impossible to reach such areas using known boats capable of carrying anglers. In addition, the use of full sized boats, and the engines to power those boats for trolling, creates excessive disturbances in the water which may drive fish away.

To address the need, a number of propelled devices have been disclosed to carry a line to a desired fishing location or for trolling such as U.S. Pat. Nos. 3,618,254 and 3,758,975. A modification to these devices provides a timer to release the sinkers and hooks at the desired time, and, hopefully, location such as disclosed in U.S. Pat. Nos. 3,710,500 and 3,911,609.

Further, a number of additional floatation devices have been developed. For example, U.S. Pat. No. 3,793,761 discloses a line controlled trolling boat. Once an electric motor is energized, the boat, mounting a fishing rod, is controlled by a single line running between the operator on the shore and the boat to control the rudder.

Radio controlled boats are disclosed in U.S. Pat. Nos. 4,161,077; 4,635,391; 4,757,633; 4,856,222 and 5,086,581. The radio controlled boat of U.S. Pat. No. 4,161,077 is controllable for speed and direction and has a line attached to the antenna so that it is released when a fish is hooked. The shore based angler then fights the fish in the normal manner. U.S. Pat. No. 4,635,391 also has a shore based angler holding the rod and reel. The boat carries the fishing line to the desired spot and, upon a radio command, releases the line into the water. The radio controlled boat of U.S. Pat. No. 4,757,633 also carries a line to a remote location. The line is magnetically attached to the boat so that the boat may be controlled to troll the line remote from the angler. Upon a strike, the line is released from the boat and the angler then actively catches the fish. U.S. Pat. No. 4,856,222 discloses a remotely controlled boat that carries a line to a remote location and releases the line when the fish is hooked. As such, it is used for trolling and once the fish is hooked, the angler then reels in the fish. Lastly, U.S. Pat. No. 5,086,581 discloses a remotely controlled boat that carries the angler's line to a remote site and drops the hook. A float is attached to the line to control the hook depth.

U.S. Pat. No. 4,339,888 uses a radio controlled boat to tow a fishing float to a designated location. The float is connected by a fishing line to a shore based retrieval system, or capstan. The float has a second line that is lowered for fishing. Upon a fish taking the hook, the float is then retrieved by the shore based capstan.

A number of patents disclose powered reels although in many cases they are used for deep water, or commercial, fishing. U.S. Pat. Nos. 3,049,829; 3,126,166; 4,283,025; 4,344,587; 4,378,652; 4,449,317; and 4,517,760 all permit powered retrieval of the line once a fish is hooked. Some are triggered by the fish taking the hook and others can be controlled by the operator.

Another problem facing anglers is the problem of snagged lines or hooks. In most cases when an angler determines the line is snagged, the line is cut at the rod and a new hook, weights, lures or other devices are attached to the line for continued fishing. To minimize the loss of line by cutting the line at the rod, U.S. Pat. Nos. 2,968,112 and 3,802,110 disclose underwater fishing line cutters that may be placed on the line and will descend along the line to the vicinity of the snag were they subsequently cut the fishing line.

Each of these groups of devices solve a particular problem directed to fishing. None of the devices disclose a complete remotely controlled fishing apparatus that allows a shore based angler to control a small fishing boat that takes the fishing line to the fish, catches and retrieves the fish and, should the line become snagged, cuts the line with a minimum loss of line.

SUMMARY OF THE INVENTION

It is an object of the invention to provide a fishing boat that permits a fishing line to be positioned in remote locations that are normally inaccessible to an angler because of distance or obstructions.

It is another object of the invention to permit remote trolling of the fishing line by a shore based angler.

A further object of the invention is to reel-in the fish to the remotely controlled boat while the angler maneuvers the boat during the engagement with the fish.

It is a further object of the invention to enable a remote cutting of the fishing line should the line become snagged on an underwater obstacle.

Another object of the invention is to provide an indication to the shore based angler that a fish has been hooked so that the angler may control the engagement and the maneuvering of the boat during the engagement with the fish.

These objects and others are accomplished by a remotely controlled fishing boat having a radio controller having at least three channels; a miniaturized boat; a motor for said boat; a radio receiver mounted on said boat for receiving said at least three channels; a rod and reel combination mounted to a stern of said boat; line cutting means for cutting a fishing line extending from the reel toward and an end of the fishing rod; and powered control means for controlling the motor, a boat rudder, and the line cutting means.

BRIEF DESCRIPTION OF THE DRAWINGS

Other objects, features, and advantages of the invention will be apparent through reference to the written description and the drawings in which.

DETAILED DESCRIPTION FOR THE PREFERRED EMBODIMENTS

Figure 1:
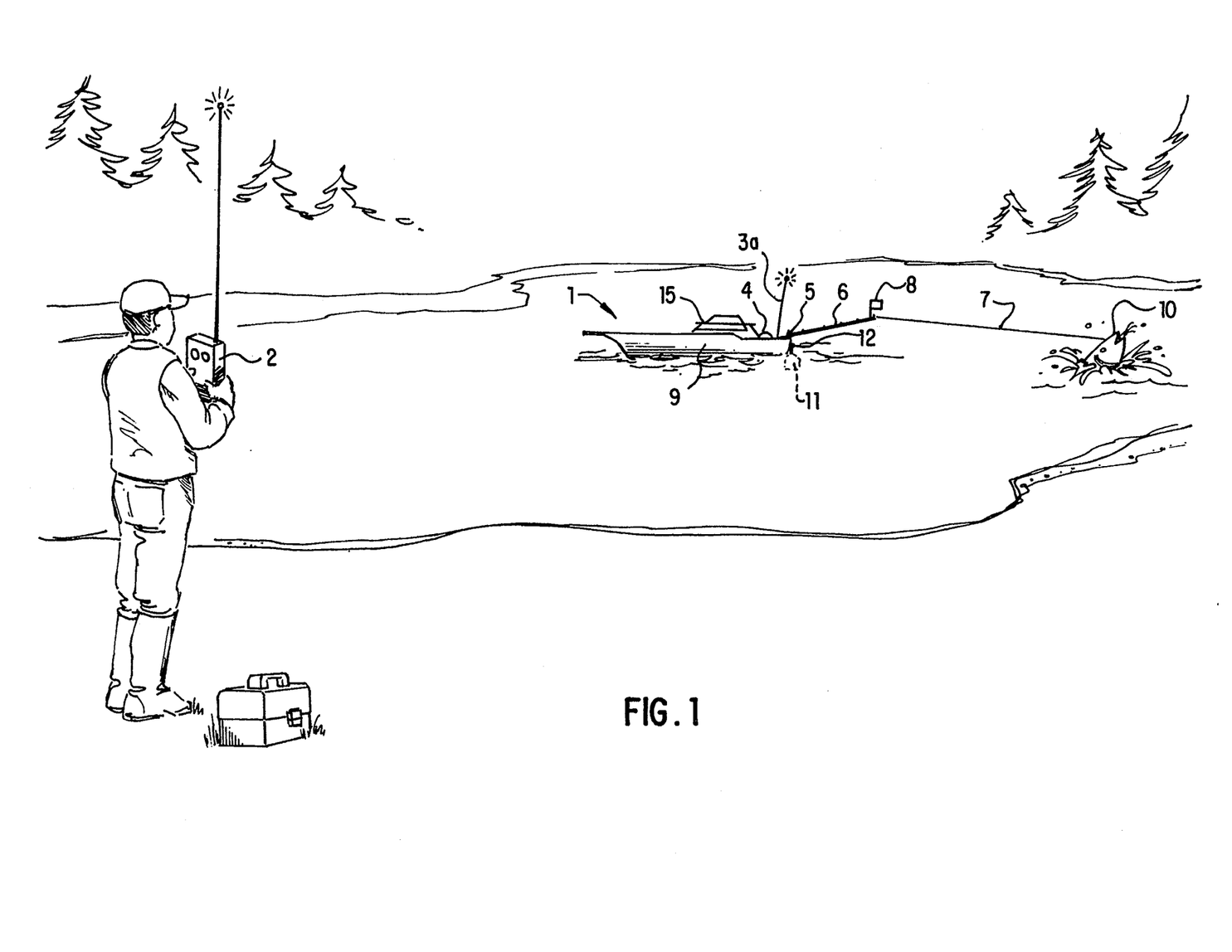
FIG. 1 provides a schematic representation of a fish engagement using the remotely controlled fishing boat.

Fishing using the remote controlled fishing boat 1 is depicted in FIG. 1. An angler, using a four channel radio controller 2, remotely operates the fishing boat 1. The signals transmitted from the controller are received by an antenna 3a of a receiver 3 mounted in the hull 9 of the fishing boat 1. Also mounted to the hull 9 is a rod 6 having a fly reel 4. Mounted to the tip of rod 6 is a flag 8, the movement of which indicates a fish 10 has taken a hook at the end of line 7. Flag 8 is normally a small red plate but may be of some other color so long as it is readily visible to the shore based operator. Alternatively, the end of the rod can be painted in an easily visible color.

The controller 2 provides a first transmission channel for operating the rudder 11, a second transmission channel for activating or power reeling the fly reel 4, a third transmission channel for operating a line cutter 5 and a fourth transmission channel for controlling the speed of the fishing boat 1.

Figure 12:
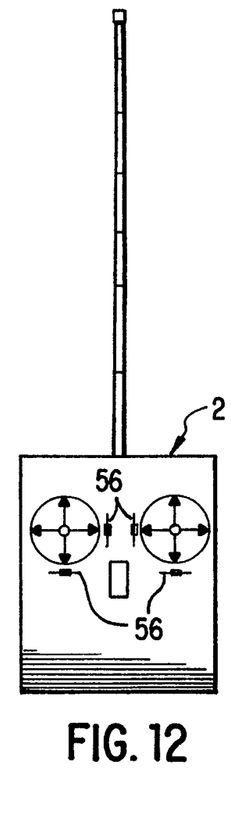
FIG. 12 shows the four channel control transmitter.
Figure 13:
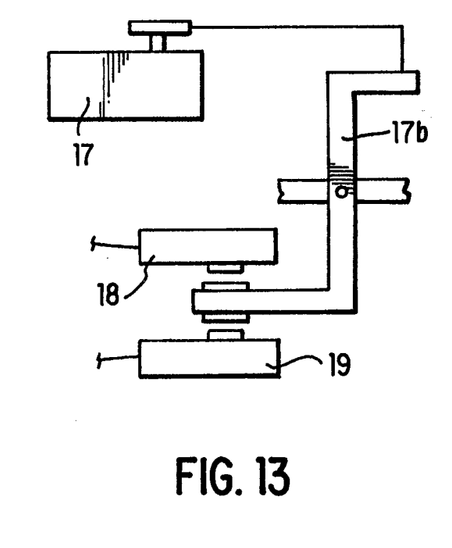
FIG. 13 schematically portrays the switch mechanism for adjusting motor power.

The controller 2, which may be a FUTUBA® Attack four channel radio, shown in FIG. 12, has four trim tabs 56 for adjusting the strength of the signals transmitted to the receiver 3 for controlling four servomotors 14,15,16 and 17 (to be discussed below). The two toggle switches each permit control of the signals transmitted on two of the transmission channels. The receiver 3, mounted in the fishing boat 1, is powered by a battery 57. In the preferred embodiment a wood boat is used.

For use in relatively quiet waters, a length of 4 feet from bow to stern with a 16 inch beam is adequate. Preferably the length is 5 to 6 feet from bow to stern with a beam of 20 to 22 inches to provide increased stability. The increased stability allows operation of the fishing boat 1 in a variety of waters. A removable top housing 15, which provides access to the power source and operating mechanisms mounted in the hull 9, is proportional to the size of the hull 9 and encloses the hull 9 when in place. The hull 9 and the removable top housing 15, although in the preferred embodiment are made of wood, may be formed of plastic, made of fiber glass or made of metal.

Figure 2:
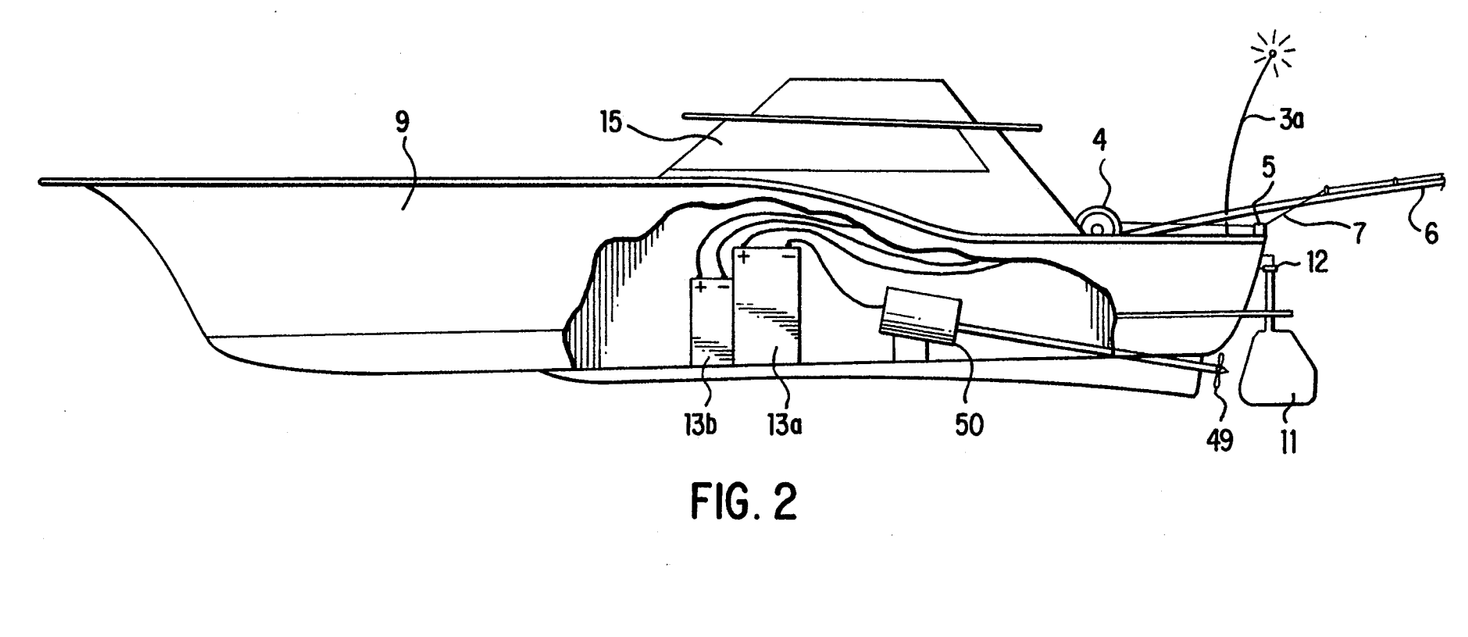
FIG. 2 shows a side, partially cut away, view of the remotely controlled fishing boat.

As shown in FIG. 2 the power source for the fishing boat 1 is a pair of rechargeable batteries. A 12 volt battery 13a is used for fighting the fish and for rapid movement of the fishing boat 1 and a 6 volt battery 13b is used for trolling and final positioning of the fishing boat 1. The batteries power a 12 volt motor 50 that drives a 3 inch propeller 49. The selection of which battery 13a,13b drives motor 50 will be addressed below. The combination of batteries provides a running time of approximately 6 to 8 hours of fishing.

Figure 11:
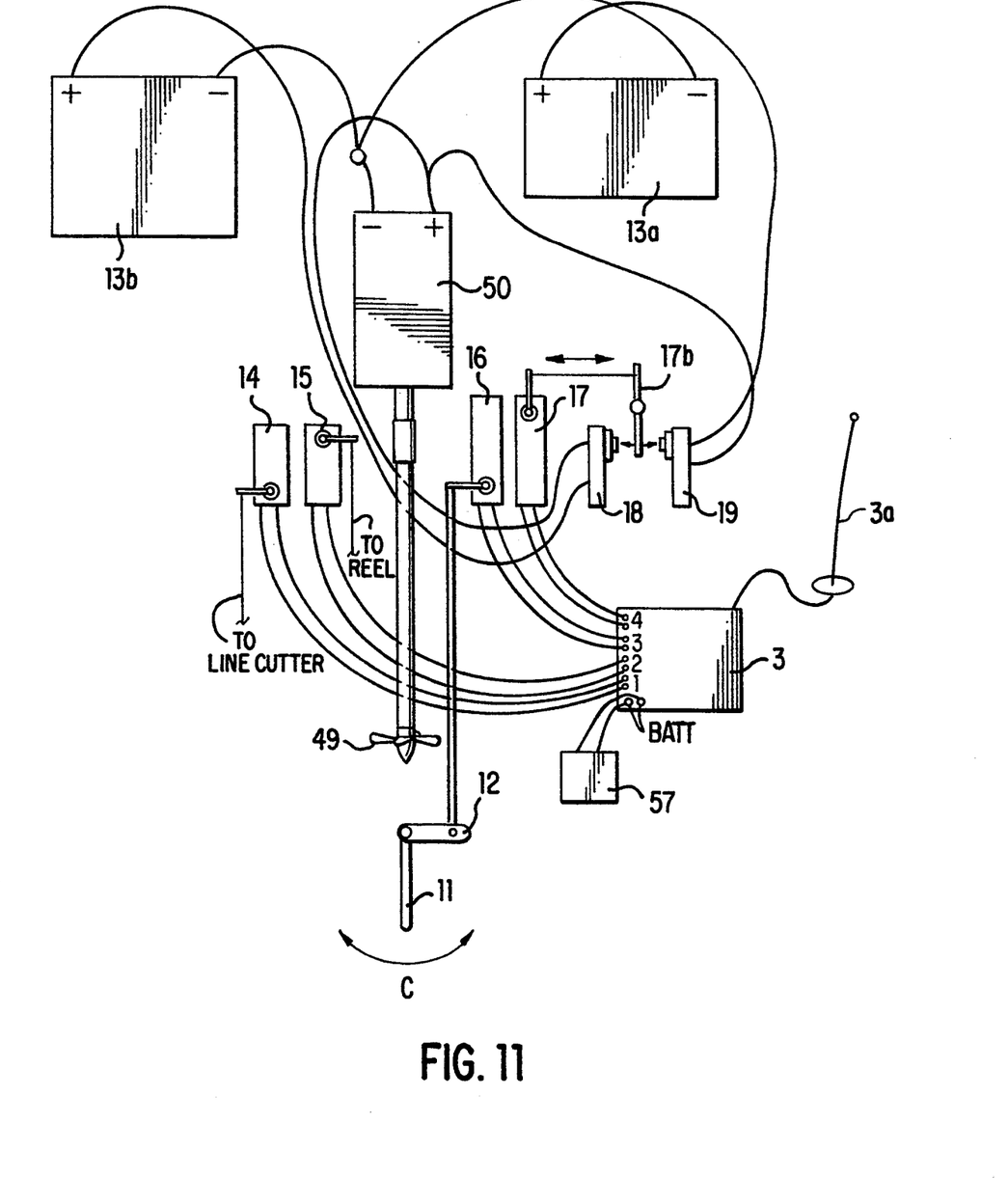
FIG. 11 is a schematic representation of the control and operating structure.

As shown in FIG. 11, control of the speed of the fishing boat 1, or its stillness in the water, is obtained by use of the fourth transmission channel of the controller 2. A servomotor 17 is activated by the signal received by receiver 3 to pivotally move a control arm 17b so as to contact either microswitch 18 or microswitch 19. When control arm 17b is in contact with microswitch 18, power from the 6 volt battery 13b is provided to motor 50 and fishing boat 1 moves at the trolling speed. When contact arm 17b contacts microswitch 19, the 12 volt battery 13a provides power to motor 50 to move the fishing boat 1 at the greater speed for fighting the fish or for rapid movement to the desired fishing area.

Alternatively, and not shown, microswitches 18,19 could be used to control forward and reverse operation of motor 50 or a proportional speed control could be introduced into the system to be controlled by the fourth transmission channel.

Figure 3:
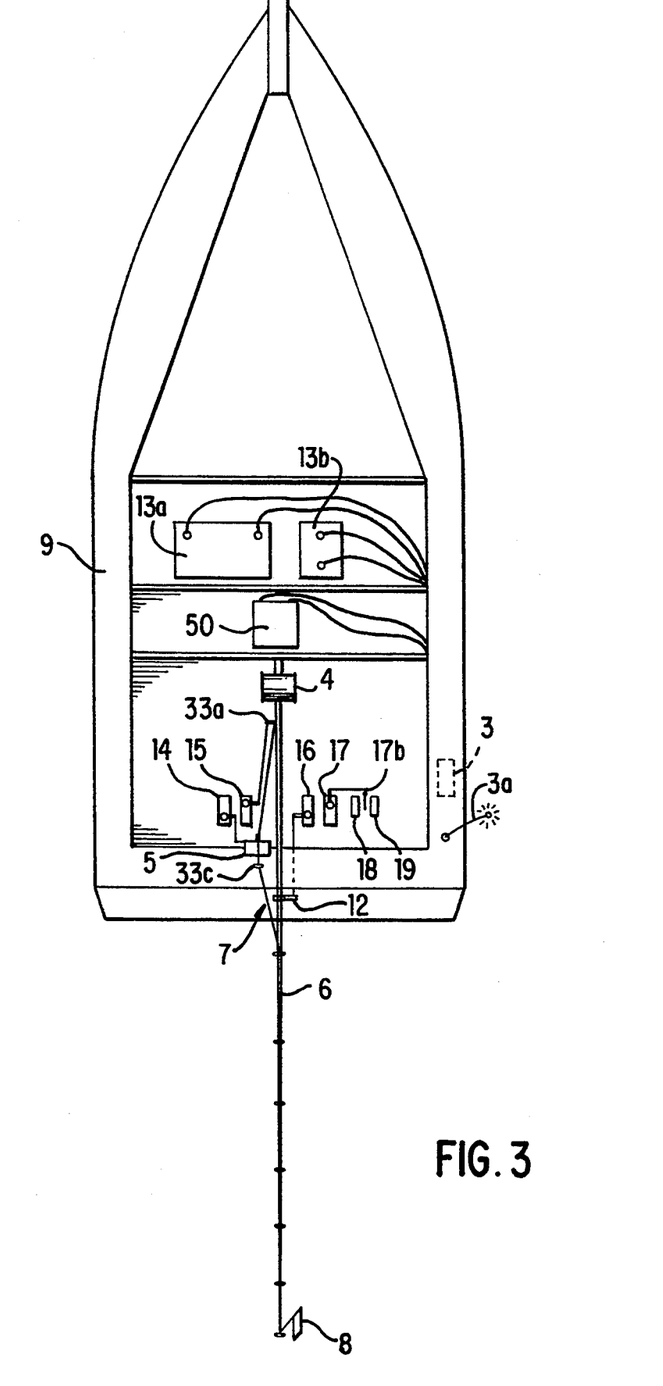
FIG. 3 shows a top view, with the top of the boat removed, of the remotely controlled fishing boat.
Figures 9, 10:
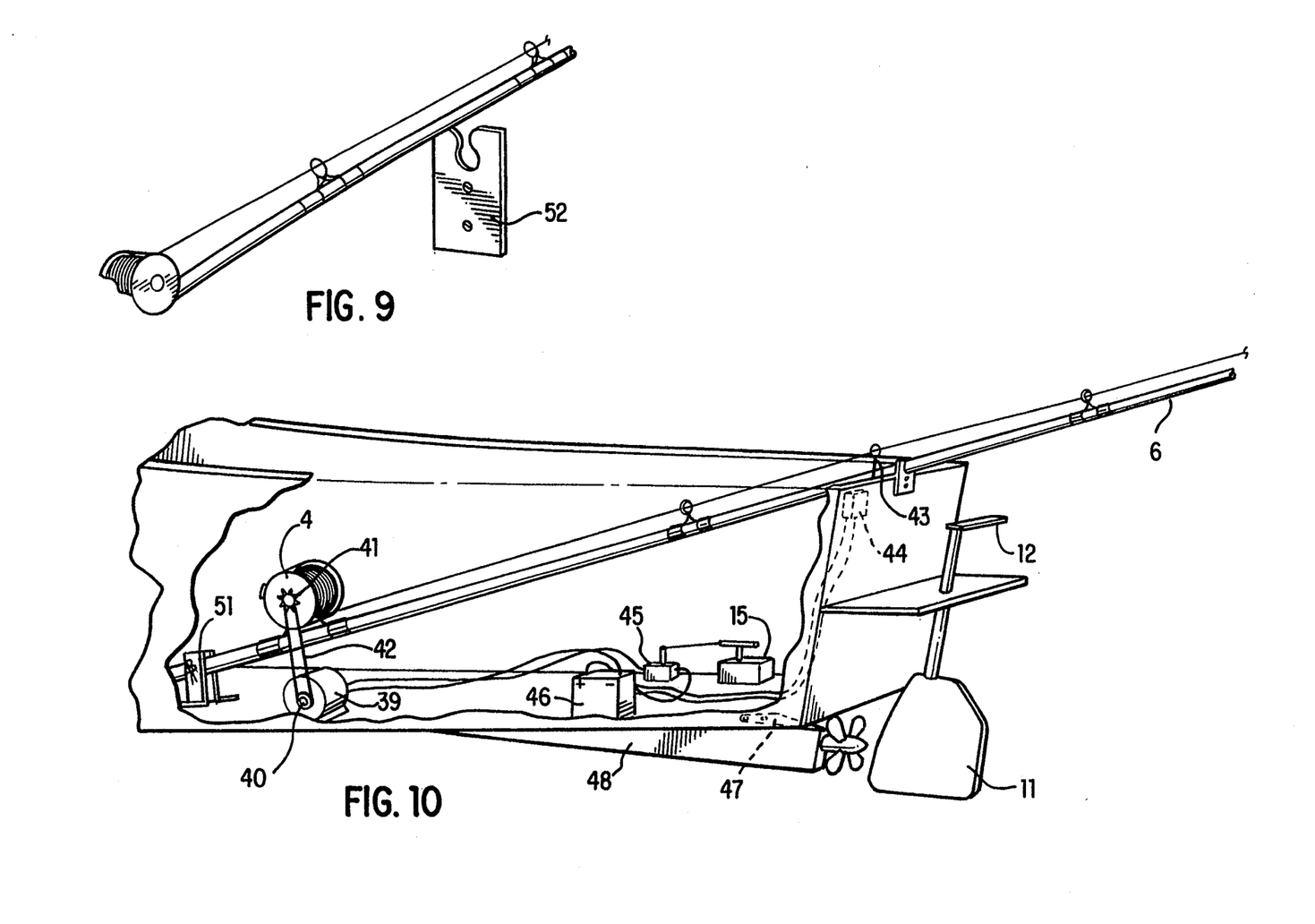
FIG. 9 shows a rod holder for retaining a fishing rod.
FIG. 10 shows power driven reel.

FIG. 3 shows a top view of the hull 9 with the top housing 15 removed. The placement and the weight of the batteries 13a,13b contribute to the stability of fishing boat 1. The rod 6 is securely set, but removably mounted to the hull 9 by means of a pin mount 51 (FIG. 10). The handle of the rod 6 is received in an opening of the mount and a removable pin is placed in the mount and through either a hole in the rod 6 or an eyelet fixedly attached to the rod 6. At the stern of the boat the rod is snap fastened into a bracket 52 (FIGS. 9 and 10).

As can also be seen in FIG. 3, four servomotors are mounted in the hull 9. The operation of servomotor 17 has been described. Servomotor 14 is provided to operate line cutter 5 and is controlled by the third transmission channel. Servomotor 15 operates the fly reel 4 and is controlled by the second transmission channel. Lastly, servomotor 16 controls movement of the rudder 11 on the basis of instructions transmitted on the first transmission channel.

The line cutter 5 and its operation will be described with reference to FIGS. 4, 5, 6 and 11. The line cutter has an upper arm 21 and a lower arm 22. A spring 23 is mounted between the upper arm 21 and the lower arm 22. A pin 27 is inserted through holes 53a,53b in upper arm 21 and lower arm 22 respectively, and a center coil of spring 23. Lower arm 22 is fixed to the stern of hull 9 of the fishing boat 1. Thus, upper arm 21 may pivot around pin 27. Spring 23 is a tension spring for forcing pad 26 into contact with pad 25 located at the ends of upper arm 21 and lower arm 22 respectively. Pads 25,26 are preferably made of a rubber material. Also attached to upper arm 21 is a sharp cutting blade 24. Extending from the end of upper arm 21 that is opposite to the end having rubber pad 26 and cutting blade 24 is a release pin 28. The release pin 28 may be made of 1/16" piano wire and has a notch in an upper surface.

Figure 4:
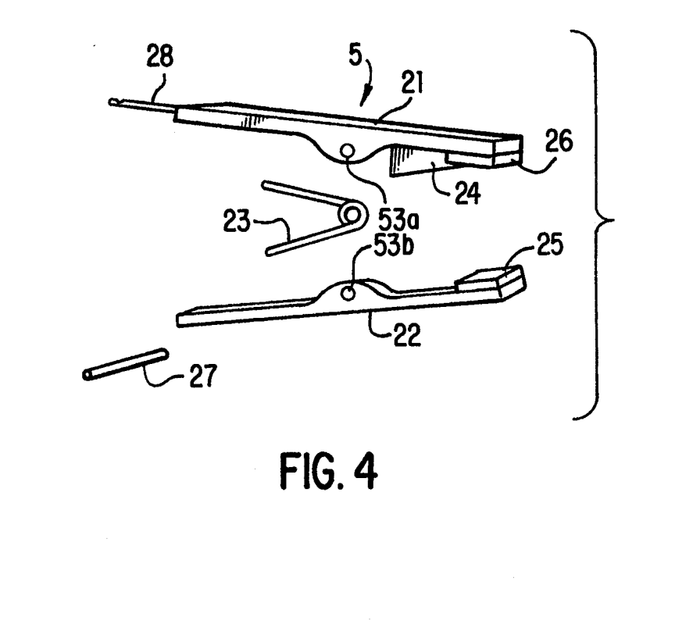
FIG. 4 shows a perspective view of a remotely controlled line cutter.
Figure 5:
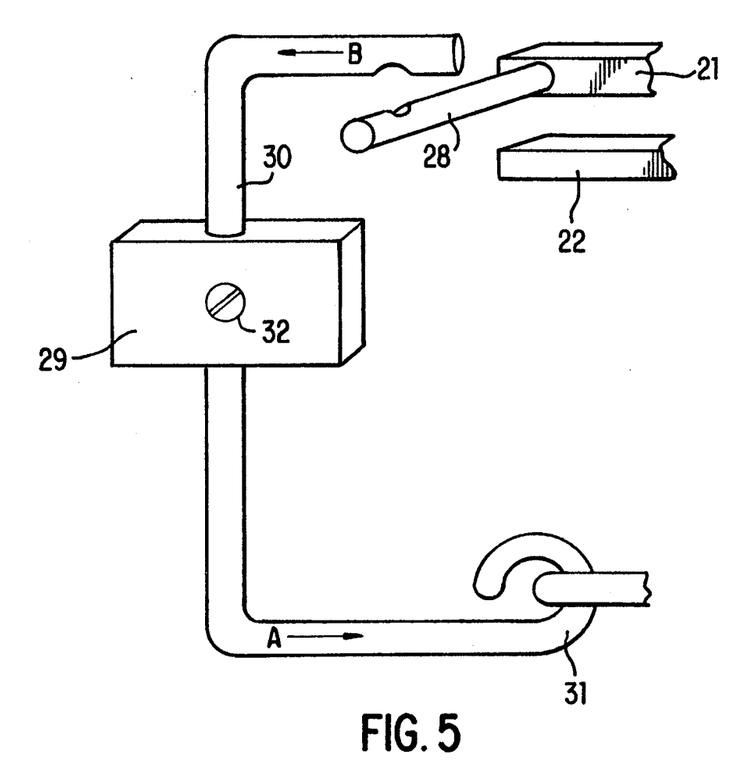
FIG. 5 shows an operating mechanism for the remotely controlled line cutter.

A trigger mechanism 29 is provided for setting line cutter 5. A body of the trigger mechanism 29 is pivotally mounted to the stern of the hull 9 by means of a screw 32. A trigger 30 extends from the body of the trigger mechanism 29 so that it passes at a right angle to release pin 28. A notch is provided in the under surface of trigger 30 to engage the notch provided in the upper surface of release pin 28.

Extending from the lower portion of the body of the trigger mechanism 29 is a length 31 that is connected to servomotor 14. When servomotor 14 is activated, by means of the third transmission channel of controller 2, servomotor 14 moves the length 31 in the direction indicated by arrow A (FIG. 5). As a result, the trigger 30 is moved in the direction indicated by arrow B (FIG. 5) thereby releasing the upper arm 21. Upon the release of the upper arm 21, spring 23 forces rubber pad 26 into contact with rubber pad 25.

Figure 6:
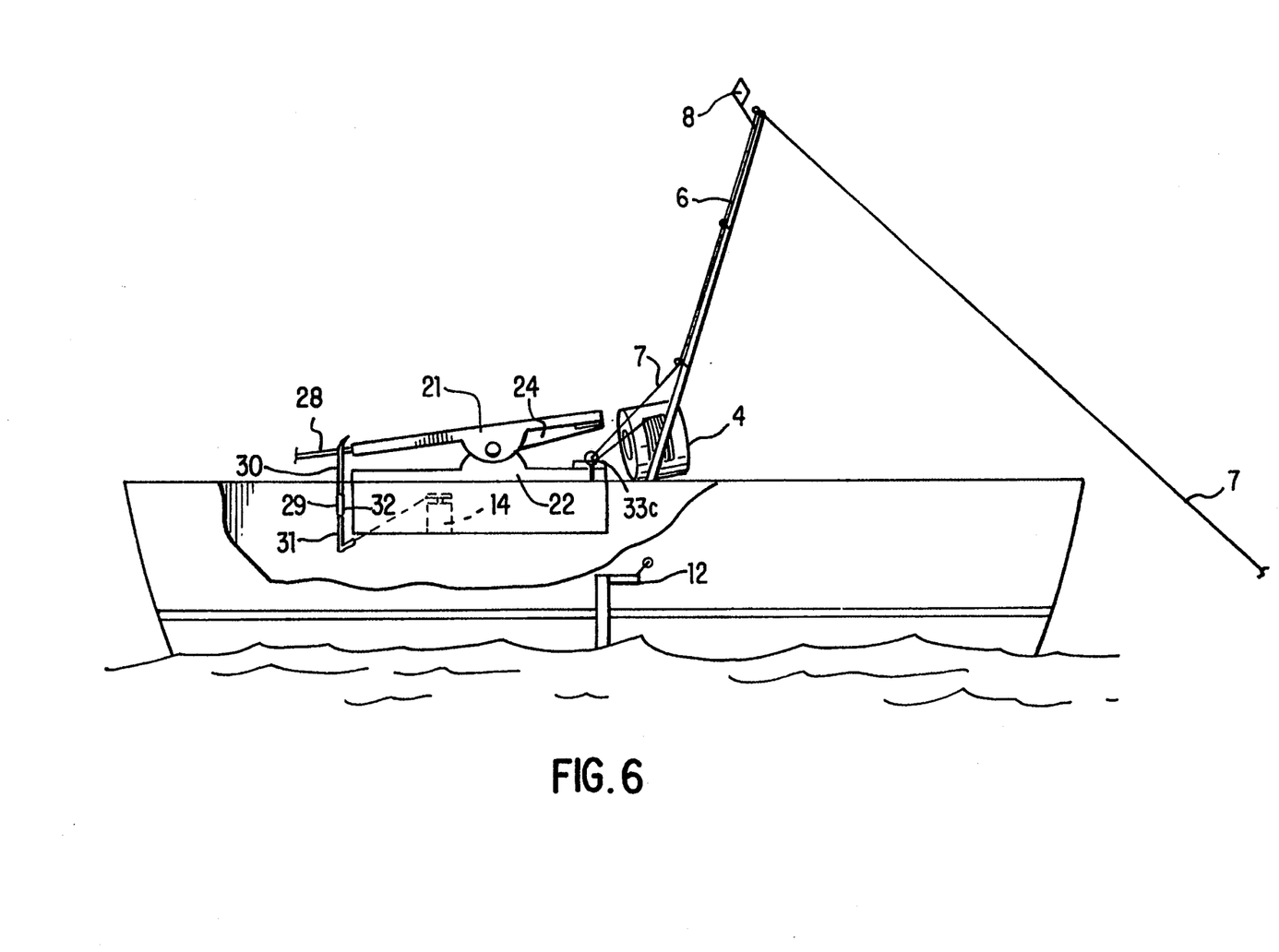
FIG. 6 shows the remotely controlled line cutter mounted to the remotely controlled fishing boat.

As can be seen in FIGS. 3 and 6, an eyelet 33c is mounted in the stern of the hull 9 so as to guide the fishing line 7 from the fly reel 4 to the rod 6 between the padded ends of upper arm 21 and lower arm 22 of line cutter 5. Thus, when the upper arm 21 is released, cutting blade 24 cuts the fishing line 7 and rubber pads 25,26 clamp together to hold the fishing line 7 to prevent retraction of the fishing line 7 into the fly reel 4.

Figure 7:
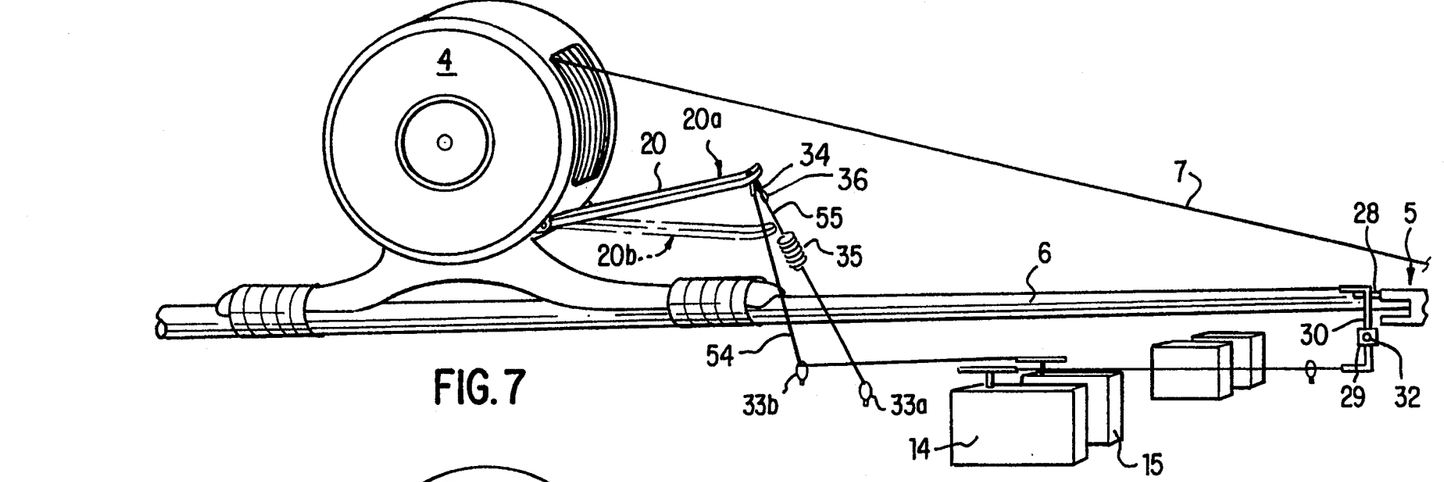
FIG. 7 shows a remotely controlled reel.
Figure 8:
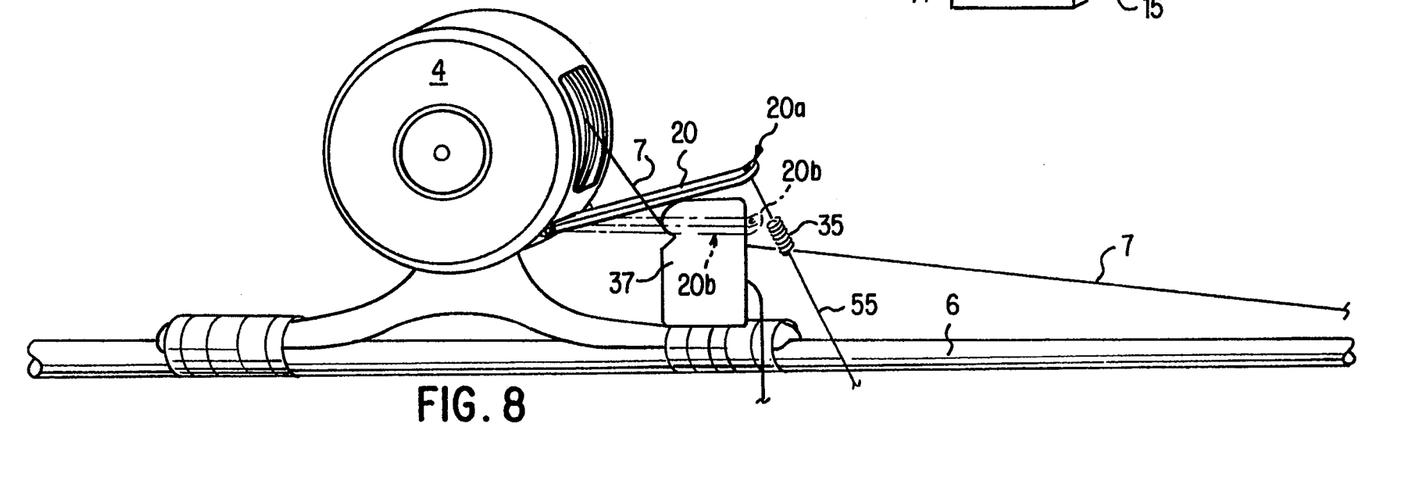
FIG. 8 shows an alternative embodiment of the remotely controlled reel.

FIGS. 7 and 8 show two embodiments of an automated fly reel 4 for use with the invention. FIG. 7 shows a line 7 extending from the automated fly reel 4 through eyelet 33c and then along rod 6 to be deployed by the fishing boat 1. The fly reel 4 is a spring tension reel as is known in the art, such as the model 8 and 81 automatic fly wheels of Martin Reel Co. Prior to moving the boat to the fishing position, approximately 30 yards of line are pulled from the fly reel 4. This may be done by holding the line and running the fishing boat 1 to a position about 30 yards from the shore. Upon reaching the position, the boat is placed in neutral. As shown in FIG. 7, a line 54 extends from an end of arm 20 through eyelets 33a and 33b to a connection with servomotor 15. During the time that fishing boat 1 is being run to the position, the servomotor 15 has been activated via the second transmission channel of controller 2 to the receiver 3 allowing line to be played out. At this time tension builds in the spring of the fly reel 4 that would cause the fishing line 7 to be wound back onto the fly reel 4 unless the fly reel 4 is locked under tension. The angler then deactivates servomotor 15. As a result, arm 20 of the reel moves to the position shown as 20a to lock the fly reel 4 so that the line cannot be rewound.

As discussed above, line 54 extends from the end of arm 20, through eyelets 33a and 33b, to be connected to servomotor 15. Also extending from the eye in arm 20 is a second line 55 having a release spring 35 therein. The second line 55, with spring 35, provides a downward pressure to arm 20 to assist arm 20 in moving to position 20b. Both lines 54,55 are attached to the hole at the end of arm 20 by swivel attachments. The swivel attachments preclude twisting in lines 54,55 that would shorten the distance.

When the angler observes movement of flag 8, a signal is sent via the second transmission channel of controller 2 to the receiver 3 to activate servomotor 15. Activation of servomotor 15 applies a tension to first line 54 which, combined with the tension of spring 35 and second line 55, pulls arm 20 from position 20a to position 20b to release the fly reel 4. The spring tension of the fly reel 4 then sets the hook in the mouth of the fish and commences reeling the fish toward the fishing boat 1.

FIG. 8 shows an alternative configuration of the automated fly reel 4. As shown in FIG. 8, the fly wheel 4 is fully automatic. After deploying the fishing line 7 to establish tension in the fly reel spring (not shown), a plug 37 is mounted between the rod 6 and the arm 20 to hold arm 20 in position 20a. The plug 37 has a notch 37a. The fishing line 7 is fed from fly reel 4 through notch 37a and thence to eyelet 33c. When the fish takes the bait or the lure, and applies tension to fishing line 7, the tension pulls plug 37 from under arm 20. As a result, line 55 with tension spring 35 therein moves arm 20 to position 20b releasing the tension spring of automatic fly wheel 4 to set the hook in the fish's mouth and to commence reeling the fish toward the fishing boat 1.

This second embodiment of a fully automated fly reel 4, frees the second transmission channel so that it can be used to control an alternative feature of fishing boat 1, the motorized reel shown in FIG. 10. In this alternative embodiment, servomotor 15 is used to control the reel motor 39. Servomotor 15 is controlled using the second transmission channel which, through receiver 3, activates an on/off motor switch 45. Alternatively, motor switch 45 can be replaced by a motor speed control. The motor switch 45, when in the on position, connects a 6 volt battery 46 to drive reel motor 39. At the end of the drive shaft of reel motor 39 is a pulley 40. A handle pulley 41 replaces the handle of fly reel 4 and an endless belt 42 connects pulley 40 to pulley 41. Thus, in this alternative embodiment when the angler sees movement of the flag 8, the angler is able, through the second transmission channel, to positively control the reeling in of the hooked fish.

In a further alternative, a micro switch 44 may be mounted to the stern. The micro switch 44 activates when a fish strikes the bait or lure to activate the reel motor 39.

FIG. 11 portrays how the boat is guided using the first operating transmission channel. The first transmission channel provides a signal through receiver 3 to activate servomotor 16 which is connected to a control arm 12. Control arm 12 is pivotally attached at one end to a linkage to the servomotor 16 and at the other end is pivotally connected to rudder 11. The rotation of the servomotor 16 is passed through control arm 12 to cause the rudder 11 to pivot as shown by arrow C.

To prevent entanglement of the drive shaft and propeller 49 of the fishing boat 1, a sharp cutting blade 47 is mounted on the keel 48. The cutting blade 47 cuts weeds, fishing line and similar materials that might wind around and entangle the drive shaft and propeller 49.

To fish with the boat 1, after mounting the rod 6 and fly reel 4 on the fishing boat 1, the angler holds the line 7 and runs the boat between 10 and 30 yards toward open water using the 12 volt battery 13a with servomotor 15 activated to move arm 20 to position 20b. The run increases the tension in the spring of the fly reel 4. The boat is then put in neutral and servomotor 15 turned off so that the arm 20 is locked in position 20a.

The fishing boat 1 is now ready for fishing. The fishing boat 1 can be trolled using the 6 volt battery 13b to power the motor 50 or it can be rapidly driven using the 12 volt battery 13a to a remote or hard to reach site and stopped allowing the line to settle for bottom fishing.

When the angler observes movement in flag 8, the angler can engage the fly reel 4 by remote control, depending upon the embodiment, or the fly reel 4 is automatically engaged so as to set the hook. After engaging the fly reel 4, operator now guides the boat back toward shore using the 12 volt battery which, in combination with the fly reel 4, tires and reels in the fish. Alternatively, in the powered fly reel 4 embodiment, the angler can control the reeling in of the fish while guiding the boat to the angler's location.

In the event that the fishing line 7 becomes snagged, the remote controlled line cutter 5 can be used to cut the line. Before cutting the line, the fly reel 4 is engaged, with the boat in neutral, so that the fly reel 4 will cause the boat to back to the location of the snag. Either the spring tension of the fly reel 4 or the powered reel 4 provides the movement.

Before cutting the line, the angler, through use of the rudder 11 and the motor 50, can attempt to drive the fishing boat 1 away from the snag opposite to the side of the snag from which the fishing boat 1 was backed, in an effort to pull the fishing line 7 and/or the hook free of the snag. If unsuccessful, the angler allows the fishing boat 1 to reel in most of the fishing line 7, with the motor 50 deactivated. When the fishing boat 1 again returns to the point of the snag, the angler activates the line cutter 5 to release the fishing boat 1 from the snagged line. The angler then returns the fishing boat 1 to the angler's location with the line cutter 5 holding the line 7. Thus, the angler can retie the line to a new hook, lure or other attachments.

What is claimed is:

1. A remote controlled fishing apparatus, comprising:
   a radio controller having at least three transmission channels;
   a miniaturized boat;
   a motor for said boat;
   a receiver mounted on said boat for receiving said at least three transmission channels;
   a rod mounted to a stern of said boat;
   a reel mounted to said rod;
   line cutting means for cutting a fishing line extending from the reel toward an end of the fishing rod; and
   powered control means for engaging the motor, a boat rudder, and the line cutting means.

2. The fishing apparatus as claimed in claim 1, further comprising means for winding the fishing line onto said reel when a fish has been hooked.

3. The fishing apparatus as claimed in claim 1, further comprising:
   a propeller shaft and propeller; and
   means for preventing entanglement of said propeller shaft and said propeller.

4. The fishing apparatus as claimed in claim 1, wherein said motor may be driven at at least two power levels.

5. The fishing apparatus as claimed in claim 4, wherein the at least two power levels are provided by two batteries having differing power outputs.

6. The fishing apparatus as claimed in claim 2, wherein a spring tension is imparted to said reel when the fishing line is deployed, said spring tension causing said reel to wind up the fishing line when the reel is released after hooking a fish.

7. The fishing apparatus as claimed in claim 1, wherein the boat has a length of at least 4 feet and a width of at least 18 inches.

8. The fishing apparatus as claimed in claim 1, further comprising a detection means mounted to a tip of the rod for providing a visual indicator when a fish has been hooked.

9. The fishing apparatus as claimed in claim 8, wherein said detection means is a flag.

10. The fishing apparatus as claimed in claim 8, wherein said detection means is a fluorescent tip applied to the end of the rod.

11. The fishing apparatus as claimed in claim 1, wherein said line cutting means comprises:
    a first section;
    a second section, said first and second sections having a rubber pad mounted at a first end so as to oppose one another;
    a removable pin for linking said first and second sections at a middle portion thereof;
    a spring mounted on said pin so as to force a second end of said first and said second sections apart from one another;
    a sharpened blade mounted at said first end of a one of said first and said second sections; and
    trigger means for releasably separating the first ends of said first and second sections.

12. The fishing apparatus as claimed in claim 1, further comprising a reel motor, wherein said power control means further provides for engaging said reel motor to wind the fishing line onto said reel.

13. A remote controlled fishing boat, comprising:
    a multiple channel radio controller;
    a boat having a hull and a removable top;
    a motor for powering said boat;
    a receiver mounted in said hull;
    means for deploying a fishing line mounted to a stern of said hull;
    a line cutter mounted to said hull; and
    a plurality of servomotors mounted in said hull, wherein said plurality of servomotors comprises at least a first servomotor for controlling the operation of said motor and a second servomotor for controlling the operation of said line cutter.

14. The remote controlled fishing boat as claimed in claim 13, wherein said radio controller has at least three transmission channels, and the plurality of servomotors further comprises a third servomotor for controlling a rudder attached to said hull.

15. The remote control fishing boat as claimed in claim 13, wherein the means for deploying a fishing line comprises a rod and a reel mounted to the stern of said hull.

16. The remote controlled fishing boat as claimed in claim 13, wherein said line cutter means comprises:
    a first section;
    a second section, said first and second sections having a rubber pad mounted at a first end so as to oppose one another;
    a removable pin for linking said first and second sections at a middle portion thereof;
    a spring mounted on said pin so as to force a second end of said first and said second sections apart from one another;
    a sharpened blade mounted at said first end of a one of said first and said second sections; and
    trigger means for releasably separating the first ends of said first and second sections.

17. The remote controlled fishing boat as claimed in claim 14, wherein said controller has a fourth transmission channel and a fourth servomotor is mounted in said hull, said fourth servomotor controlling one of an automatic take up of said reel and a motor for powering said reel.

18. A remotely controlled fishing vehicle, comprising:
    a powered platform;
    control means for controlling said powered platform from a remote location;
    a rod mounted to said powered platform;
    a reel mounted to said rod; and
    line cutting means for cutting a fishing line deployed from said reel, wherein said control means also controls said line cutting means.

19. The fishing device as claimed in claim 18, further comprising a motor for powering said powered platform, said motor being selectively powered by a one of two batteries, said two batteries having different power outputs.

20. The remotely controlled fishing device as claimed in claim 18, further comprising a motor for powering said powered platform, said motor being a variable speed motor.

* * * * *